US009032284B2

(12) United States Patent
Arora et al.

(10) Patent No.: US 9,032,284 B2
(45) Date of Patent: May 12, 2015

(54) GREEN PRINTING: RE-PURPOSING A DOCUMENT TO SAVE INK AND PAPER

(75) Inventors: Kapil Arora, New Delhi (IN); Harsh Vardhan Chopra, New Delhi (IN); Naveen Goel, Uttar Pradesh (IN); Mayur Hemani, New Delhi (IN); Himanshu Jindal, Punjab (IN); Neha Rastogi, Uttar Pradesh (IN); Hemant Virmani, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 120 days.

(21) Appl. No.: 12/849,231

(22) Filed: Aug. 3, 2010

(65) Prior Publication Data

US 2012/0033237 A1 Feb. 9, 2012

(51) Int. Cl.
*G06F 3/12* (2006.01)

(52) U.S. Cl.
CPC ............ *G06F 3/1284* (2013.01); *G06F 3/1219* (2013.01); *G06F 3/125* (2013.01); *G06F 3/1254* (2013.01); *G06F 2206/1514* (2013.01)

(58) Field of Classification Search
CPC .................................................... G06F 3/1219
USPC ......................................... 715/220, 236, 276
See application file for complete search history.

(56) References Cited

U.S. PATENT DOCUMENTS

| 6,128,655 A | 10/2000 | Fields et al. |
| 6,266,684 B1 | 7/2001 | Kraus et al. |
| 7,206,784 B2 | 4/2007 | Gu et al. |
| 7,231,593 B1 | 6/2007 | Raja et al. |
| 7,237,188 B1 | 6/2007 | Leung |
| 7,366,981 B2 | 4/2008 | Wu et al. |
| 7,599,094 B2 * | 10/2009 | Sellers et al. .................. 358/2.1 |
| 7,680,858 B2 | 3/2010 | Poola et al. |
| 7,882,427 B2 | 2/2011 | Raja et al. |
| 7,907,151 B2 | 3/2011 | Daviss |
| 8,024,412 B2 | 9/2011 | McCann et al. |
| 8,085,421 B2 | 12/2011 | Hamilton, II et al. |
| 8,305,653 B2 | 11/2012 | Austin et al. |
| 8,397,155 B1 | 3/2013 | Szabo |
| 8,407,579 B2 | 3/2013 | Raja et al. |
| 8,451,489 B1 | 5/2013 | Arora |

(Continued)

OTHER PUBLICATIONS

Curtis D. Frye, Excel Annoyances, Dec. 28, 2004, O'Reilly Media, Inc., 18 pages.*

(Continued)

*Primary Examiner* — Cesar Paula
*Assistant Examiner* — Mohammed-Ibrahim Zuberi
(74) *Attorney, Agent, or Firm* — Wolfe-SBMC (57) ABSTRACT

Green printing is utilized to repurpose a document. An indication is received that a printout of a document from a printer has been requested. The document has content with a format that would result in a first quantity of pages being printed. The content is grouped into one or more regions. Further, one or more transformations are applied to the content for each region such that the printer prints the document with the content in a transformed format that results in a second quantity of pages being printed without falling below a predetermined readability threshold. The second quantity of pages is less than the first quantity of pages. Further, the one or more transformations being applied to the document may result in a second quantity of ink being utilized to print the document such that the second quantity of ink being less than the first quantity of ink.

20 Claims, 4 Drawing Sheets

(56) References Cited

U.S. PATENT DOCUMENTS

| | | | |
|---|---|---|---|
| 8,467,082 B1* | 6/2013 | Miller et al. | 358/1.15 |
| 8,705,092 B2 | 4/2014 | Goel et al. | |
| 8,767,255 B2* | 7/2014 | Ha et al. | 358/1.9 |
| 8,773,712 B2 | 7/2014 | Chopra et al. | |
| 8,799,761 B2 | 8/2014 | Goel et al. | |
| 2002/0135800 A1* | 9/2002 | Dutta | 358/1.15 |
| 2003/0110227 A1 | 6/2003 | O'Hagan | |
| 2003/0163537 A1 | 8/2003 | Rohall et al. | |
| 2004/0017577 A1* | 1/2004 | Ostrover et al. | 358/1.8 |
| 2004/0019699 A1 | 1/2004 | Dam et al. | |
| 2004/0044735 A1 | 3/2004 | Hoblit | |
| 2004/0049730 A1 | 3/2004 | Ishizaka | |
| 2004/0068698 A1 | 4/2004 | Wu et al. | |
| 2004/0205607 A1 | 10/2004 | Kim et al. | |
| 2005/0004990 A1 | 1/2005 | Durazo et al. | |
| 2005/0231758 A1 | 10/2005 | Reynolds | |
| 2006/0015804 A1* | 1/2006 | Barton et al. | 715/503 |
| 2006/0167976 A1 | 7/2006 | Brown et al. | |
| 2007/0127064 A1 | 6/2007 | Kuroshima | |
| 2007/0273895 A1* | 11/2007 | Cudd et al. | 358/1.1 |
| 2008/0086695 A1 | 4/2008 | Oral | |
| 2008/0137132 A1 | 6/2008 | Perronnin | |
| 2008/0159768 A1 | 7/2008 | Katoh et al. | |
| 2008/0288860 A1 | 11/2008 | Daviss | |
| 2009/0063245 A1* | 3/2009 | Anderson | 705/9 |
| 2009/0100374 A1* | 4/2009 | Sheasby et al. | 715/788 |
| 2009/0119272 A1 | 5/2009 | Sastry | |
| 2009/0249193 A1 | 10/2009 | Hanechak | |
| 2010/0027051 A1* | 2/2010 | Hamilton et al. | 358/1.15 |
| 2010/0079510 A1* | 4/2010 | DiBiase et al. | 347/5 |
| 2010/0123908 A1 | 5/2010 | Denoue et al. | |
| 2010/0188681 A1* | 7/2010 | Kawano | 358/1.13 |
| 2010/0214614 A1* | 8/2010 | Ferlitsch et al. | 358/1.18 |
| 2010/0235456 A1 | 9/2010 | Uchiyama et al. | |
| 2010/0281351 A1* | 11/2010 | Mohammed | 715/205 |
| 2011/0032562 A1* | 2/2011 | McCuen et al. | 358/1.15 |
| 2011/0043831 A1* | 2/2011 | Sprague et al. | 358/1.2 |
| 2011/0145085 A1* | 6/2011 | Khachatrian et al. | 705/26.1 |
| 2011/0235064 A1 | 9/2011 | Arai | |
| 2011/0273739 A1 | 11/2011 | Grasso et al. | |
| 2012/0002226 A1* | 1/2012 | Zhan | 358/1.11 |
| 2013/0128301 A1 | 5/2013 | Goel et al. | |
| 2013/0128314 A1 | 5/2013 | Chopra et al. | |
| 2013/0128315 A1 | 5/2013 | Arora et al. | |
| 2013/0132812 A1 | 5/2013 | Goel et al. | |
| 2013/0132817 A1 | 5/2013 | Sharad et al. | |

OTHER PUBLICATIONS

"Final Office Action", U.S. Appl. No. 12/849,349, (Oct. 24, 2012), 14 pages.

"Final Office Action", U.S. Appl. No. 12/849,475, (Aug. 20, 2012), 14 pages.

"Invent Wheel: Print What You Like Online Printing", retrieved from <http://www.inventwheel.com/web/articleDetailsByVersion.action?versionId=8> on Jan. 8, 2012, 3 pages.

"Non-Final Office Action", U.S. Appl. No. 12/849,306, (Oct. 9, 2012), 11 pages.

"Non-Final Office Action", U.S. Appl. No. 12/849,349, (May 21, 2012), 14 pages.

"Non-Final Office Action", U.S. Appl. No. 12/849,417, (Dec. 5, 2012), 12 pages.

"Non-Final Office Action", U.S. Appl. No. 12/849,475, (Jan. 19, 2012), 12 pages.

"PrintWhatYouLike.com", retrieved from <http://www.printwhatyoulike.com/> on Aug. 2, 2010, 2 pages.

Henry, Alan "Print Friendly for Chrome Lets You Easily Remove Unwanted Web Page Elements Before Printing", retrieved from <http://lifehacker.com5865826/print-friendly-for-chrome-lets-you-easily-remove-unwanted-web-page-elements-before-printing> on Jan. 8, 2012, (Dec. 7, 2011), 3 pages.

Remick, Jarel "Printing Pages with Print What You Like", retrieved from <http://web.appstorm.net/how-to/printing-pages-with-print-what-you-like/> on Jan. 8, 2012, 14 pages.

"Final Office Action", U.S. Appl. No. 12/849,306, (Apr. 25, 2013), 14 pages.

"Non-Final Office Action", U.S. Appl. No. 12/849,349, (Mar. 18, 2013), 15 pages.

"Non-Final Office Action", U.S. Appl. No. 12/849,519, (Mar. 1, 2013), 5 pages.

"Notice of Allowance", U.S. Appl. No. 12/849,519, (Apr. 15, 2013), 7 pages.

"Notice of Allowance", U.S. Appl. No. 12/846,417, Jan. 7, 2014, 8 pages.

"Final Office Action", U.S. Appl. No. 12/849,475, Dec. 24, 2013, 12 pages.

"Notice of Allowance", U.S. Appl. No. 12/849,306, Nov. 22, 2013, 8 pages.

"Advisory Action", U.S. Appl. No. 12/849,417, (Nov. 14, 2013), 2 pages.

"Final Office Action", U.S. Appl. No. 12/849,349, (Aug. 19, 2013),16 pages.

"Final Office Action", U.S. Appl. No. 12/849,417, (Sep. 4, 2013),13 pages.

"Notice of Allowance", U.S. Appl. No. 12/849,349, Apr. 11, 2014, 15 pages.

"Non-Final Office Action", U.S. Appl. No. 12/849,475, Oct. 16, 2014, 11 pages.

"Notice of Allowance", U.S. Appl. No. 12/849,417, Jan. 7, 2014, 8 pages.

* cited by examiner

GREEN PRINTING: RE-PURPOSING A DOCUMENT TO SAVE INK AND PAPER

BACKGROUND

1. Field

This disclosure generally relates to printing. More particularly, the disclosure relates to the reduction of paper and/or ink utilized for printing.

2. General Background

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use computer printers to print large quantities of various types of documents, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to receive an indication that a printout of a document from a printer has been requested. The document has content with a format that would result in a first quantity of pages being printed. Further, the computer readable program when executed on the computer causes the computer to group the content into one or more regions. In addition, the computer readable program when executed on the computer causes the computer to identify one or more potential transformations for each region based on one or more rules. The computer readable program when executed on the computer also causes the computer to order the one or more potential transformations according to a cost function. Further, the computer readable program when executed on the computer causes the computer to apply one or more transformations to the content for each region such that the printer prints the document with the content in a transformed format that results in a second quantity of pages being printed without falling below a predetermined readability threshold, the second quantity of pages being less than the first quantity of pages.

In another aspect of the disclosure, a process is provided. The process receives an indication that a printout of a document from a printer has been requested. The document has content with a format that would result in a first quantity of pages being printed. Further, the process groups the content into one or more regions. In addition, the process identifies one or more potential transformations for each region based on one or more rules. The process also orders the one or more potential transformations according to a cost function. Further, the process applies, with a processor, one or more transformations to the content for each region such that the printer prints the document with the content in a transformed format that results in a second quantity of pages being printed without falling below a predetermined readability threshold, the second quantity of pages being less than the first quantity of pages.

In yet another aspect of the disclosure, a system is provided. The system includes a green print module that (i) receives an indication that a printout of a document from a printer has been requested, the document having content with a format that would result in a first quantity of pages being printed, (ii) groups the content into one or more regions, (iii) identifies one or more potential transformations for each region based on one or more rules, and (iv) orders the one or more potential transformations according to a cost function. Further, the system includes a processor that applies one or more transformations to the content for each region such that the printer prints the document with the content in a transformed format that results in a second quantity of pages being printed without falling below a predetermined readability threshold, the second quantity of pages being less than the first quantity of pages.

DRAWINGS

The above-mentioned features of the present disclosure will become more apparent with reference to the following description taken in conjunction with the accompanying drawings wherein like reference numerals denote like elements and in which.

DETAILED DESCRIPTION

A green printing configuration is provided herein to save paper and/or ink. The green printing configuration is a configuration that reduces the number of pages and/or ink utilized to print a document through content repurposing, which is an approach that transforms content and formatting to shrink the size of the content to fit into fewer pages while at the same time retaining the readability and aesthetics of the document. A document is herein intended to cover a word processing document, a presentation document, a spreadsheet, an e-mail message, PDF, web page, or any other group of printable data that may be stored in a file on a computer readable medium and has a well-defined display and/or print markup. The green printing configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages and less ink than a typical printed document.

A document may have different kinds of content elements including blocks of text, images, graphics, tables, etc. Further, a document may have non-content elements such as layout constraints, .text formatting, fonts, and spacing elements. Examples of layout constraints include page dimension, margins, gutters, and orientation. Each element contributes to the overall appearance of a document. With respect to printing, the content in a document cannot be significantly changed as the user will likely want to print the content in the document. Accordingly, the green printing configuration may maintain the content as a constant during the green printing of a document. Optionally, unnecessary content such as headers, footers, etc. may be removed.

The non-content elements primarily contribute to the visual appearance of the document. For example, the non-content elements may function as separators for blocks of content, signifiers of importance, signifiers of relevance, and/or markers of relatedness. These non-content elements are the document formatting of the document. The document formatting contributes to certain redundancies in the document by making the document occupy more space. The green printing of a document utilizes these redundancies in a manner that provides a quantifiable trade off between the number of pages and/or the amount of ink utilized by the content and the overall appearance of the document.

A word processing document may have three types of redundancies. First, the word processing document may have a redundancy that affects the number of pages occupied by the content. Second, the word processing document may have a redundancy that affects the amount of ink utilized to print the document. Finally, the word processing document may have a redundancy that affects both the paper and the ink.

Content repurposing may minimize or eliminate redundant white space. Further, content repurposing may reduce the size of large text in a document. In other words, content repurposing automatically adjusts the format of the content according to the adjustments that a user would most likely want to see in order to reduce the number of pages in the document so that the user can still comfortably read the document.

The transformations utilized for content repurposing have the goal of reducing the overall redundancy in a document. Although a group of transformations together may reduce the redundancy, one or more of the transformations may individually increase the redundancy. The redundancy for an individual transformation may be increased to accentuate certain characteristics of the document to add to the aesthetic appeal and/or readability of the document. For example, if and when a document is printed with multiple pages per paper sheet, a green print program may automatically decide to increase the size of the text to make the text more readable.

A transformation may have a magnitude associated therewith. In one embodiment, the magnitude may be binary. The binary magnitude may indicate whether a transformation is applied or not applied, e.g., "0" equals transformation is not to be applied and "1" equals transformation is to be applied. In another embodiment, the magnitude may have a set of pre-defined discrete values. In another embodiment, the magnitude may take continuous values.

Each instance of a transformation type may have a transformation cost associated therewith for a particular document type. In other words, a particular sizing transformation may have a different transformation cost for different documents of the same type or for different documents of different types.

Further, each transformation may have an associated paper saving potential. For example, a particular textual transformation may save one tenth of a sheet of paper. In addition, each transformation may have an associated saved ink quantity. The transformation may potentially have both a saved paper quantity and a saved ink quantity if both paper and ink would be saved as a result of the transformation.

Figure 1:
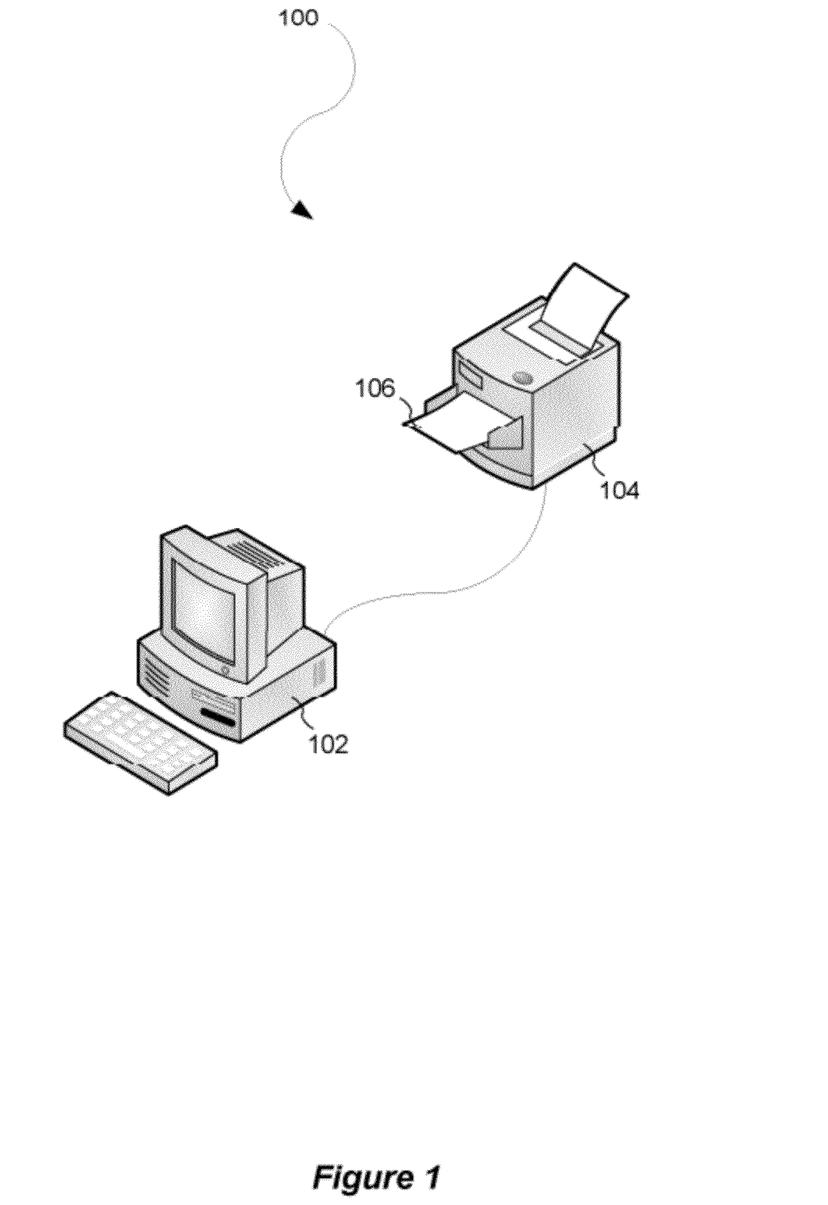
FIG. 1 illustrates a green printing configuration.

FIG. 1 illustrates a green printing configuration 100. As an example, a computing device 102 is illustrated as a PC. Further, as an example, the computing device 102 is operably connected to a printer 104 through a wireline connection. The term computing device 102 is herein intended to include a personal computer ("PC"), desktop computer, laptop, notebook, cell phone, smart phone, personal digital assistant ("PDA"), kiosk, etc. Further, the computing device 102 may be a client, server, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer may or may not be part of a network. Further, the printer 104 may utilize any type of printing methodology to print on paper 106, e.g. laser printing, ink jet printing, or the like.

Figure 2:
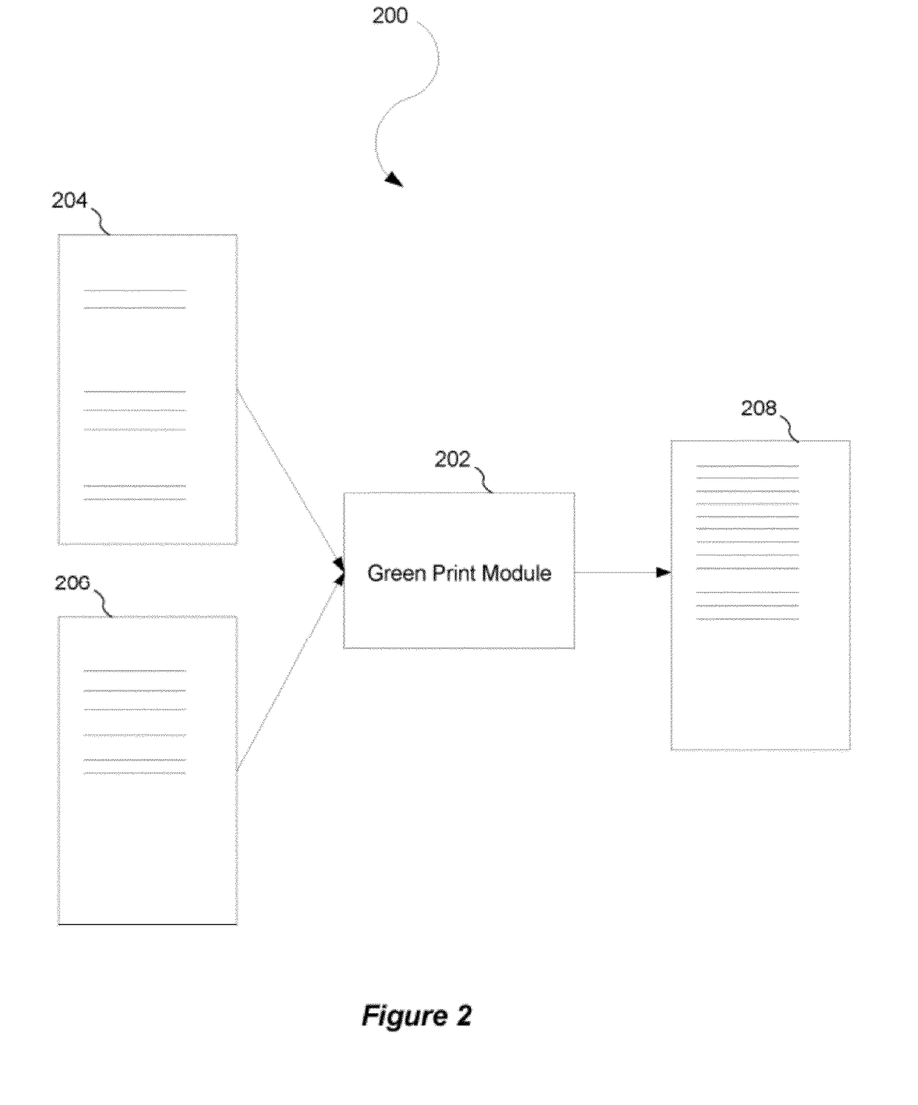
FIG. 2 illustrates a green print module that may be utilized with the green printing configuration.

FIG. 2 illustrates a green print module 202 that may be utilized with the green printing configuration 100. The green print module 202 may be stored in the computing device 102 or the printer 104. The green print module 202 may be a stand alone application, plugin, part of another application, etc. The green print module 202 may analyze the content of multiple pages, sections, etc. of a document to repurpose the content to save paper and/or ink. For example, the green print module 202 may analyze a first page 204 and a second page 206 of the document. The green print module 202 may then repurpose the content of the document so that the document has a repurposed page 208 that has the content from the first page 204 and the second page 206 in a readable format. Lines are provided in a document as illustrated in drawings such as FIG. 2 to represent text, symbols, shapes, images, and/or the like.

Figure 3:
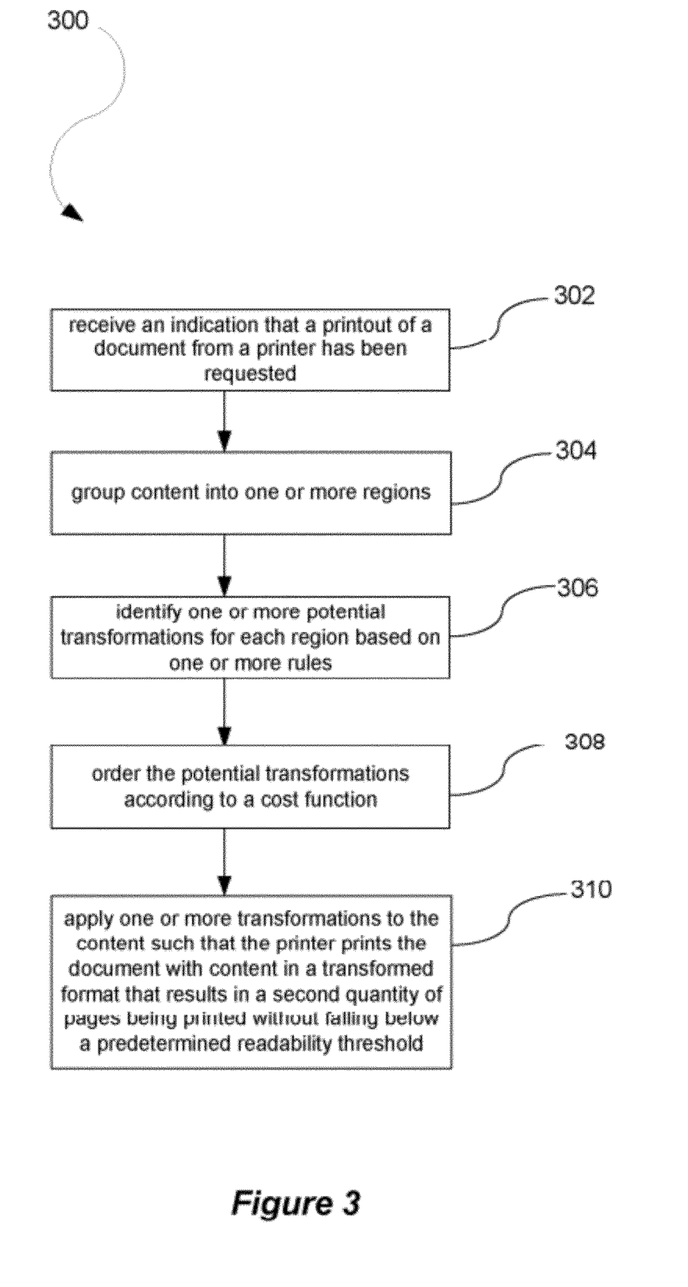
FIG. 3 illustrates a process that may be utilized to repurpose a document.

FIG. 3 illustrates a process 300 that may be utilized to repurpose a document. At a process block 302, the process 300 receives an indication that a printout of a document from a printer has been requested. For example, the green print module 202 illustrated in FIG. 2 may received a message that a user has initiated a print command. Alternatively, the indication may be the print command itself. The document has content with a format that would result in a first quantity of pages being printed. Further, at a process block 304, the process 300 groups the content into one or more regions. In other words, boundaries for homogenous content blocks or regions are demarcated. In one embodiment, these regions may also be labeled. In addition, at a process block 306, the process 300 identifies one or more potential transformations for each region based on one or more rules. In one embodiment, the one or more rules are heuristics. In other words, the rules may be developed by experimentation to assess the likelihood of readability by a user. At a process block 308, the process 300 orders the one or more potential transformations according to a cost function. In one embodiment, all of the potential transformations are ordered according to the cost function. For example, two potential transformations for a first group and three potential transformations for a second group are all analyzed together in view of the cost functions to determine an overall ordering. In an alternative embodiment, the potential transformations are ordered for each group. For example, two potential transformations for a first group may be ordered according to the cost function whereas three potential transformations for a second group may be ordered according to the cost function. In one embodiment, the same cost function may be utilized for different groups. In another embodiment, different cost functions may be utilized for different groups. Further, at a process block 310, the process 300 applies one or more transformations to the content for each region such that the printer prints the document with the content in a transformed format that results in a second quantity of pages being printed without falling below a predetermined readability threshold. The second quantity of pages is less than the first quantity of pages.

By automatically reducing the number of pages from the original format that results in a first quantity of printed pages to a repurposed format that results in a second quantity of pages, the original appearance of the document is lost. Accordingly, the trade-off between the appearance of the document and the amount of savings achieved from green printing is quantified according to a repurposing quantifier. In one embodiment, the appearance of the document is quantified in terms of aesthetic attributes and a measure of the influence of one or more transformations on the document. In one embodiment, a readability threshold may be established to specify the degree to which the appearance of the document may be degraded for the purpose of green printing. Further, the document may be automatically repurposed without the distortion falling below the readability threshold. The readability threshold may be based one or more readability rules. Instead of basing the readability threshold on a subjective measure of appearance, the readability threshold is based on specific measurements from the document. Those specific measurements are utilized to determine the risks associated with transforming certain portions of the document in view of the readability rules.

In another embodiment, the green printing configuration 100 may be utilized to repurpose content to save paper by utilizing one or more automatically selected page templates. Content and layout constraints for different pages may be specified by one or more page templates. The green printing configuration 100 navigates through the document content and selects the most optimal page template for the content. A page template encodes such information as how many images, e.g., shapes may be present in the page, where the images are located, an allowed size of the images, how many columns the text is to be arranged into, the margins and gutters of the content, the text style to be utilized for the page, and/or the like. Examples of text style are type, size, etc. The page template may be characterized as a style sheet for a document page. The one or more page templates may be automatically selected for the content by matching constraints imposed by the page the one or more page templates and one or more content characteristics. For example, a page in the input document that has an image cannot be fit into a text-only template. Examples of additional constraints include the number of images, number of paragraphs and characters per paragraph, number of tables on the page, etc. The automatic selection does not necessitate content on one page in the input document being mapped exactly to a single page in the new document. As a result, the template selection process is simplified as a mapping to a single page in the new document would have to be identified.

Figure 4:
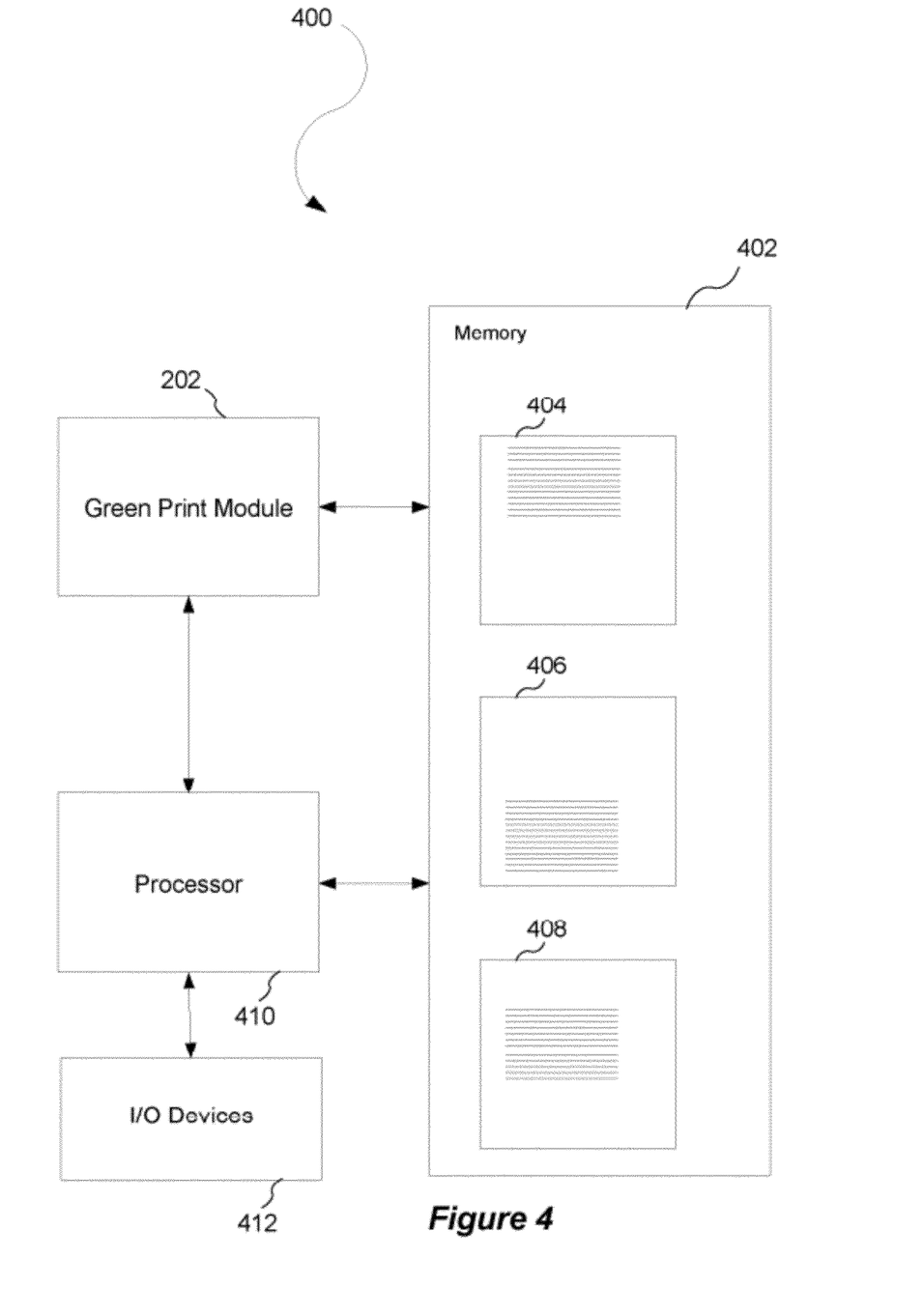
FIG. 4 illustrates a system configuration that may be utilized for green printing.

FIG. 4 illustrates a system configuration 400 that may be utilized for green printing. In one embodiment, the green print module 202 interacts with a memory 402. The green print module 202 generates a variety of potential repurposed documents that meet the readability threshold. For example, a first potential repurposed document 404 may have text according to one format that meets the readability threshold, a second potential repurposed document 406 may have text according to another format that meets the readability threshold, and a third potential repurposed document 408 may have text according to yet another format that meets the readability threshold. The green print module may select one final repurposed document from these potential repurposed documents by utilizing the repurposing quantifier. The repurposing quantifier may be the result of an equation that is based on the number of pages reduced and the degradation of the readability. Even if all of the potential repurposed documents meet the readability threshold, a higher score will generally be given to a first repurposed document that degrades readability less than a second repurposed document with the same number of reduced pages. Further, even if all of the potential repurposed documents meet the readability threshold, a higher score will generally be given to a first repurposed document that reduces more pages than a second repurposed document with the same readability degradation. In other words, the highest score will be given to the potential repurposed document that as a whole minimizes readability degradation and maximizes page reduction better than the other potential repurposed documents.

After the green print module 202 selects a potential repurposed document, the green print module 202 provides the repurposed document to a processor 410. Further, the processor 410 applies the transformations to the potential repurposed document so that the user may print the final repurposed document. The processor 410 interacts with input/output ("I/O") devices 412. For example, the processor 412 receives an input from a user through a keyboard to print the document. The processor 412 may then print the repurposed document on a printer.

In one embodiment, a green score may be indicated for a document. The system configuration 100 may inform a user how green the document is by utilizing a scoring methodology. The scoring is based on measuring the total paper and ink saving potential of all applicable transformations for the document. In other words, a display device may provide a user with an indication of what changes the user can make to the document to save paper and/or ink. The indication may be provided when a user is editing the document. Alternatively, the indication may be provided to the user when the user is not editing the document.

In another embodiment, the system configuration 400 is suitable for storing and/or executing program code and is implemented using a general purpose computer or any other hardware equivalents. The processor 410 is coupled, either directly or indirectly, to the memory 402 through a system bus. The memory 402 can include local memory employed during actual execution of the program code, bulk storage, and/or cache memories which provide temporary storage of at least some program code in order to reduce the number of times code must be retrieved from bulk storage during execution.

The I/O devices 412 can be coupled directly to the system 400 or through intervening input/output controllers. Further, the I/O devices 412 can include a keyboard, a keypad, a mouse, a microphone for capturing speech commands, a pointing device, and other user input devices that will be recognized by one of ordinary skill in the art. Further, the I/O devices 412 can include output devices such as a printer, display screen, or the like. Further, the I/O devices 412 can include a receiver, transmitter, speaker, display, image capture sensor, biometric sensor, etc. In addition, the I/O devices 412 can include storage devices such as a tape drive, floppy drive, hard disk drive, compact disk ("CD") drive, etc.

Network adapters may also be coupled to the system configuration 400 to enable the system configuration 400 to become coupled to other systems, remote printers, or storage devices through intervening private or public networks. Modems, cable modems, and Ethernet cards are just a few of the currently available types of network adapters.

The green printing configuration 100 may be utilized with a variety of different types of documents. A variety of examples are provided herein to illustrate the flexibility of the green printing configuration 100.

As an example, the green printing configuration 100 may be utilized to repurpose a presentation document. A process may be utilized by the green print module 202 illustrated in FIG. 2 to analyze a presentation document for the purpose of selecting one or more transformations to the presentation document for green printing. The process preprocesses the presentation document. By preprocessing, the process acquires information about the presentation including, but not limited to, shape dimensions, fills, text fonts, grouping information, and/or z-order, i.e., overlap, information. Further, the process performs frame detection. Many presentations have animations. The frame detection identifies a logical keyframe that can be printed rather than printing the entire slide. The frame detection is optional. In addition, the process performs an overlap analysis, which helps identify which shapes overlap with other shapes and in what z-order. This information is useful during the removal of fills as the appearance of the shapes as they are should be maintained. In one embodiment, the slides are converted to raster and replaced. In one embodiment, the process may be performed without the overlap analysis. The process also performs shape labeling. In one embodiment, a shape label may be a text box that is part of a diagram. A plurality of labeling rules may be utilized to identify and/or generate labels, which may be assigned one or more output characteristics. For example, a shape label may be assigned an output characteristic such as the size of text. Further, the process performs shape grouping. A diagram may be characterized as a group of shapes that may or may not be grouped. The shape grouping groups shapes and structures that have to move together in any transformation. A plurality of grouping rules may be utilized to perform the group shaping. In one embodiment, the shape labeling helps identify that the shapes and structures that have to be grouped together. In addition, the process performs slide labeling, which identifies logical constructs such as title slides, separation slides, agenda slides, or the like. Such slides are given relative importance during transformation of their content. Prior to finalizing the layout of the content, the process performs slide content transformation, which removes shape fills and optimizes the size of each content block. For example, a text box may have lines of text with large fonts, large line spacing, large paragraph spacing, and/or blank lines. The shape fills and sizes are reduced according to the labels assigned to the shapes and the slides. The process performs a content re-layout to decide the final placement of the content in the output. For example, the scaling and placement decisions are made for the output. For instance, vertical gaps between groups, managing bounding boxes, or the like are handled. Further, the content re-layout may attempt a fit-to-page approach to fully utilize the pages that the content will occupy eventually. The process also generates a green presentation document according to the content re-layout. The objects are placed on the output slides. All of the subcomponents of the process are not required for operation of the process.

As another example, the green printing configuration 100 may be utilized to repurpose e-mail correspondence. A process may be utilized by the green print module 202 illustrated in FIG. 2 to receive an indication that a printout of e-mail correspondence from a printer has been requested. The e-mail correspondence has content with a format that would result in a first quantity of pages being printed. Further, the process detects a plurality of e-mail messages that belong to an e-mail conversation tree. In addition, the process reorders, with the processor, the plurality of e-mail messages in the e-mail conversation tree according to a respective timestamp associated with each e-mail message in the plurality of e-mail messages. The respective timestamp indicates a time of transmission. The process also determines, with the processor, a root e-mail message according to an earliest respective timestamp. The root e-mail message is a root node of the e-mail conversation tree. Further, the process also records a plurality of content blocks from the root e-mail message as a set of print blocks. In addition, the process compares a subsequent e-mail message in the e-mail conversation tree with the root e-mail message. Further, at the process records, into the set of print blocks, one or more content blocks from the plurality of subsequent e-mail message content blocks that are not already in the set of print blocks. In one embodiment, the content blocks from the plurality of subsequent e-mail message content blocks that are already in the set of print blocks are omitted. In another embodiment, a reference is placed instead of the duplicate content blocks. The reference indicates the page on which the content block is printed. In another embodiment, a reference is not utilized. In other words, the duplicate content block is omitted. In addition, the process generates, with the processor, green e-mail correspondence based on the print blocks such that the green e-mail correspondence has a second quantity of pages that is less than the first quantity of pages. All of the subcomponents of the process are not required for operation of the process.

As yet another example, the green printing configuration 100 may be utilized to repurpose a spreadsheet. A process may be utilized by the green print module illustrated in FIG. 2 to determine a printable range for a spreadsheet. Further, the process detects print zones. In addition, the process performs overlap analysis for shapes. The overlap analysis helps identify which shapes overlap with other shapes and in what z-order. This information is useful during the removal of fills as the appearance of the shapes as they are should be maintained. The process also isolates each print zone. Further, the process transforms each print zone. In addition, the process performs page fitting. The process also performs content re-layout if necessary. The process generates a green spreadsheet. The content re-layout is utilized to decide the final placement of the content in the output. For example, the scaling and placement decisions are made for the output. For instance, vertical gaps between groups, managing bounding boxes, or the like are handled. Further, the content re-layout may attempt a fit-to-page approach to fully utilize the pages that the content will occupy eventually. If the content re-layout was not necessary, the process generates the green spreadsheet. All of the subcomponents of the process are not required for operation of the process.

As yet another example, the green printing configuration 100 may be utilized to repurpose a word processing document. A process may be utilized by the green print module illustrated in FIG. 2 to preprocess the word processing document to ensure that the word processing document may be safely transformed. The process determines if the word processing document can be safely transformed. If the process determines that transformation to a green word processing document would potentially lead to some loss of information, e.g., an image obscured by some text, and/or the transformation would lead to a green documentation is not readable and aesthetically pleasing, the process prints the word processing document without repurposing the content. Alternatively, if the process determines that transformation to a green word processing document would be safe, the process groups and segments content from the word processing document. Logical groups of content are formed to stay together during transformation. In one embodiment, a set of grouping rules is utilized. For example, content that is adjacent and possibly on the same page stay together during the transformation. As a result, both the appearance of the green document and size reduction of the content are managed. In another embodiment, a set of region identification rules is utilized. The content blocks may be labeled to identify what they represent semantically so that the cost of applying transformations to the content blocks may be evaluated. The semantic labeling may be based on labels that are utilized with a particular word processing software program and the related structured document formats. In one embodiment, the document is segmented into regions of homogeneous characteristics. For example, the document may be segmented into text regions, text regions with small images, text regions with tables, etc. The process utilizes green printing to apply transformations based on the type of region. Some regions may undergo similar and/or different types of transformations as other regions. The process then performs planning for one or more transformations. The planning may include an analysis of different potential green printouts. Finally, the process performs one or more transformations to generate the green word processing document. All of the subcomponents of the process are not required for operation of the process.

As another example, the green printing configuration 100 may be utilized to green print a PDF document. A process may be utilized by the green print module illustrated in FIG. 2 to preprocess a PDF document. The pre-processing acquires information about the PDF document. The information may include identifying text, images, vector objects, dimensions (bounding boxes), text fonts, etc. These elements can be represented in a page as cells of well defined bound boxes. These cells may be grouped together to maintain the reading context of the individual element/cell. For example, overlapping vector graphics cells may be grouped together so that they can be formatted individually and placed in their entirety. Otherwise, in the re-layout phase the individual objects may be placed far apart, which may lead a less readable output. Similarly, original multicolumn text cells may be identified and merged in to a single text cell containing the entire multicolumn text in reading order. The preprocessing determines how many pages may be saved in the PDF document to figure out whether or not the number of pages should be reduced. For example, if the PDF document has only one page, then the green printing configuration will only save ink.

In one embodiment, a subprocess may be utilized to identify the cell groups. The subprocess may find the set of isolated cells (bounding boxes) B in the PDF page. Further, the subprocess may group the cells in B by utilizing heuristic rules which output the logical elements in the page. For every cell C in B, the subprocess groups the cells in B utilizing heuristic rules, which output the logical elements in the PDF page. For every cell C in B, the set of cells B' that lies in the proximity of C is found. The cells in B' can either lie in horizontal proximity or in vertical proximity. A plurality of factors may be utilized to make the decision as to which cells are chosen. The type of individual cells is a factor. For example, text cells will be merged with the graphic cells, e.g., image/vector arts, only when the text cells overlap with the graphic cells. Similarly, graphic cells can be merged with text cells even if they don't overlap with text cells, but lie in a small proximity. Another factor is that a merged cell should not contain empty areas beyond a certain threshold. Yet another factor is that multi-column text cells should not be merged as is, but rather in a single text cell in which all the text of individual cells should be added in the reading order.

The subprocess creates a merged cell merged (C). For every region C' in B, a determination is made to figure out whether or not C' was merged with merged cell merged (C). If C' was merged with merged cell merged (C), C' is removed from B. Further, the subprocess removes C from B. In addition, the subprocess adds the new merged cell merged (C) to B. After the initial finding of isolated cells, the subprocess repeats the remaining portions of the subprocess for every other cell present in the set B.

Further, the process performs a complexity analysis. The grouped cells are utilized to categorize certain pages and some content elements as being too complex for complete transformation. Certain rules are utilized for such categorization, e.g. the number of overlapped images/vectors in a given PDF page, presence of form field, etc. Such pages are typically converted to raster and replaced. This mechanism of complexity analysis also ensures the correctness of the entire green printing of PDF document approach.

The preprocessing allows the subprocess to find out the source of the document. For example, if the document that was converted to a PDF was a word processing document rather than a spreadsheet program, then one type of green transformations are utilized for a word processing document.

Further, the process creates a document object model ("DOM"). A PDF document is generally not created by keeping any specific document structure in mind. However, a tagged PDF provides some information in terms of logical constructs such as a table of contents, paragraph, tables, drawing, etc. Accordingly, the creation of the DOM model first involves tagging the input PDF if the PDF is not already tagged. Subsequently, higher level constructs such as cover page, reference page, background image, etc. will be identified utilizing a heuristic rule based model. The grouped cells that were identified will be tagged as high level document constructs utilizing this rule model. These constructs will be considered while applying a transformation.

This structure creation is helpful because a PDF document inherently does not support any document structure or any relationship between different objects. Therefore, a high level flow able structure is created to be utilized in content re-layout. This structure extraction is not same as object recognition in images, etc. Semantic tags are applied that are helpful in printing. For example, a group of vector paths may not necessarily be a single diagram, but is labeled so, because the label helps in placing all the vector arts together while laying out the output pages.

In addition, the process performs DOM analysis. Certain entities are identified in the PDF document. As examples, the process may identify page labels and object labels. A page label may be a page that is labeled as a cover page, table of contents page, content page, reference/index page, etc. An object label may be a PDF object in a page that is labeled as a header/footer, paragraph, main heading, sub heading, figure/background, table, figure/table caption, etc. These provide a way to control the formatting of content in the output. For example, headings and table/figure captions on all output pages need to be have the same font size so that the overall appearance of the output is consistent. In one embodiment, heuristic rules are utilized to identify these entities. The heuristic rules are based on characteristics such as sequence of appearance for pages, location on the page, and relative text sizes for objects only containing text. The base probabilities for these characteristics for each of the entities may be determined by analyzing large number of real world PDF files to create a training data set.

In one embodiment, a subprocess that labels given pages/objects takes a set of rules R ($R_1 \ldots R_k$) such that each jth rule provides a basic success probability $P(R_j)$. For example, if a rule $R_j$ for any construct C is computed as successful, that rule $R_j$ will increase the probability of identifying that PDF object as construct C by $P(R_j)$. The document construct identification (Page level/Object level) may be performed as follows. The set of rules that identifies an input document construct C is found. For every rule C' in C, a determination is made as to whether or not the rule is successful for the given page/cells. If the rule is successful for the given page/cells, then $P_c$ (Probability of the given page/cells to be C)+=P(C'). Further, if $P_c$>threshold and C is an object level rule, all the individual cells are grouped into a single cell and the grouped cell is marked as C. Otherwise if $P_c$>threshold and C is an Page level rule, the input page is marked as C. After the subprocess is completed, all the cells identified will be tagged as high level document constructs, which will be transformed to create a green PDF.

The process then performs content repurposing. Certain green transformations are applied on the document constructs. For example, a paragraph may have some text with large font size, color, and large blank line space. The font size is reduced by analyzing all the font sizes present in the PDF document and normalizing them. Also line spacing may be reduced without affecting the readability of the paragraph.

Similarly to save ink, some graying transformations may be performed. Since PDF as a document format supports multiple color spaces, this property may be utilized to save ink in printing already grayed content which contains grey color values in RGB color space as R=G=B color values. When such content is printed on paper, RGB color values are converted in to CMYK color space. The CMYK is a subtractive color model that is utilized in color printing and refers to the four inks utilized in color printing: cyan, magenta, yellow, and black. Printing CMYK colors for gray colors consumes all ink toners present in the printer to represent the correct grey color. This consumption can be avoided in PDF by converting RGB color space to CMYK as a green transformation. All the grey content with R=G=B color representation is then converted into a single K value. After this transformation, grey content will consume only K toner on printers which is already does not support under color removal.

Finally, the process performs content re-layout. The content re-layout decides the final placement of the content in the output. In one embodiment, a special re-layout engine may be utilized to convert the high level constructs in to concrete PDF objects and to perform all necessary scaling. The re-layout engine may also take placement decisions for the output. The content re-layout also reduces the vertical gaps between objects, manages bounding boxes, etc. The content re-layout also attempts to fully utilize the pages that the content will occupy eventually, i.e., fit-to-page. As a result of the content re-layout, a green PDF document is created. All of the sub-components of the process are not required for operation of the process.

In one embodiment, a user may provide an input such as selecting a button to only save ink. In another embodiment, the user may provide an input such as selecting a button to only save paper. In yet another embodiment, the user may provide an input such as selecting a button to save both ink and paper.

The examples of different types of documents that may be utilized with the green printing configuration 100 are provided only as examples. The green printing configuration 100 is not limited to these examples and can be utilized with other types of documents.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A computer program product comprising a computer usable storage device having a computer readable program, wherein the computer readable program when executed on a computer causes the computer to:
   receive an indication to print a document that includes content formatted to print in a first quantity of pages;
   group the content into two or more regions based, at least in part, on a shape of the content;
   assign a label to each region;
   identify one or more potential transformations for each region based on one or more rules, at least one region having a different number of potential transformations identified relative to another region;
   evaluate a cost of applying the one or more potential transformations to each region based, at least in part, on the assigned label; and
   responsive to the evaluating, apply one or more transformations individually to each region to change the formatting of content within the regions such that the document includes content in a transformed format printable in a second quantity of pages without falling below a predetermined readability threshold, the second quantity of pages being less than the first quantity of pages.

2. The computer program product of claim 1, wherein the predetermined readability threshold is established to determine potential degradability of the document.

3. The computer program product of claim 2, wherein the predetermined readability threshold is based on one or more measurements from the document.

4. The computer program product of claim 1, wherein the content includes one or more of text, an image, a graphic, or a table.

5. The computer program product of claim 1, wherein the computer is further caused to perform overlap analysis to identify a first shape that overlaps with a second shape.

6. The computer program product of claim 1, wherein the document is utilized by at least one of a word processing program, a spreadsheet program, or a PDF program.

7. The computer program product of claim 1, wherein the computer is further caused to assign a higher score to a first repurposed document that reduces more pages than a second repurposed document, the first and second repurposed documents each providing substantially similar readability degradation.

8. The computer program product of claim 1, wherein at least one of the one or more transformations is applied to less than all of the two or more regions.

9. The computer program product of claim 1, wherein the computer is further caused to provide a green score of the word processing document.

10. The computer program product of claim 1, wherein the one or more transformations are applied by utilizing one or more automatically selected page templates.

11. A method comprising:
receiving an indication to print a document that includes content formatted to print in a first quantity of pages;
grouping the content into two or more regions based, at least in part, on a shape of the content;
assigning a label to each region;
identifying one or more potential transformations for each region based on one or more rules, at least one region having a different number of potential transformations identified relative to another region;
evaluating a cost of applying the one or more potential transformations to each region based, at least in part, on the assigned label; and
responsive to the evaluating, applying one or more transformations individually to each region to change the formatting of content within the regions such that the document includes content in a transformed format printable in a second quantity of pages without falling below a predetermined readability threshold, the second quantity of pages being less than the first quantity of pages.

12. The method of claim 11, wherein the predetermined readability threshold is established to determine potential degradability of the document.

13. The method of claim 12, wherein the predetermined readability threshold is based on one or more measurements from the document.

14. The method of claim 11, wherein the content includes one or more of text, an image, a graphic, or a table.

15. The method of claim 11, wherein the computer is further caused to perform overlap analysis to identify a first shape that overlaps with a second shape.

16. The method of claim 11, wherein the document is utilized by at least one of a word processing program, a spreadsheet program, or a PDF program.

17. A system comprising:
one or more processors; and
one or more memories storing multiple instructions thereon that, responsive to execution by the one or more processors, causes a green print module to:
receive an indication to print a document that includes content formatted to print in a first quantity of pages;
group the content into two or more regions based, at least in part, on a shape of the content;
assign a label to each region;
identify one or more potential transformations for each region based on one or more rules, at least one region having a different number of potential transformations identified relative to another region;
evaluate a cost of applying the one or more potential transformations to each region based, at least in part, on the assigned label; and
responsive to the evaluating, apply one or more transformations individually to each region to change the formatting of content within the regions such that the document includes content in a transformed format printable in a second quantity of pages without falling below a predetermined readability threshold, the second quantity of pages being less than the first quantity of pages.

18. The system of claim 17, wherein the document is utilized by at least one of a word processing program, a spreadsheet program, or a PDF program.

19. The system of claim 17, wherein the computer is further caused to provide a green score of the word processing document.

20. The system of claim 17, wherein the one or more transformations are applied by utilizing one or more automatically selected page templates.

* * * * *